No. 776,325. PATENTED NOV. 29, 1904.
L. M. HODGE.
MEASURING INSTRUMENT.
APPLICATION FILED NOV. 6, 1903.
NO MODEL. 2 SHEETS—SHEET 1.
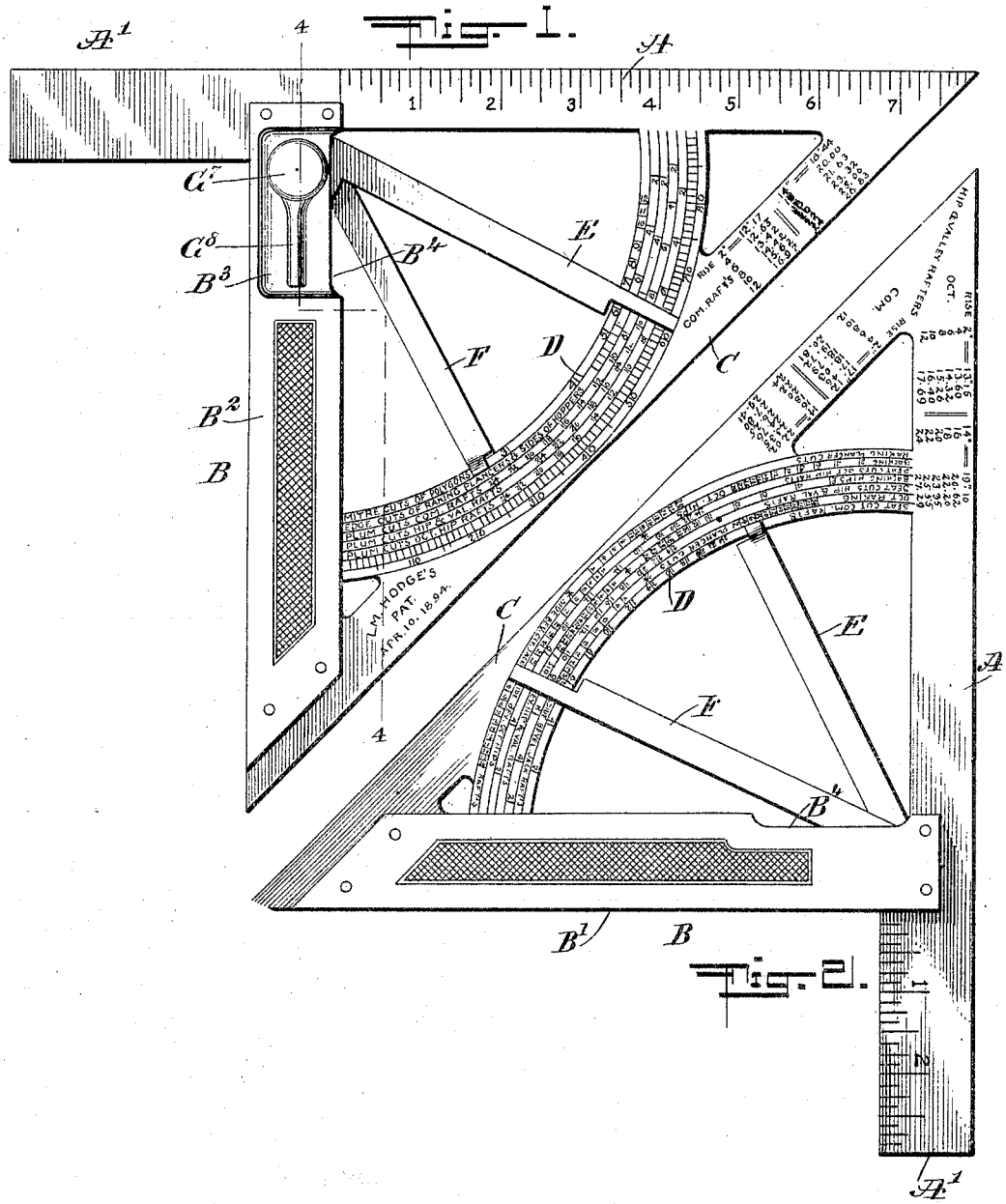
WITNESSES:
INVENTOR
Leonard M. Hodge
BY
ATTORNEYS

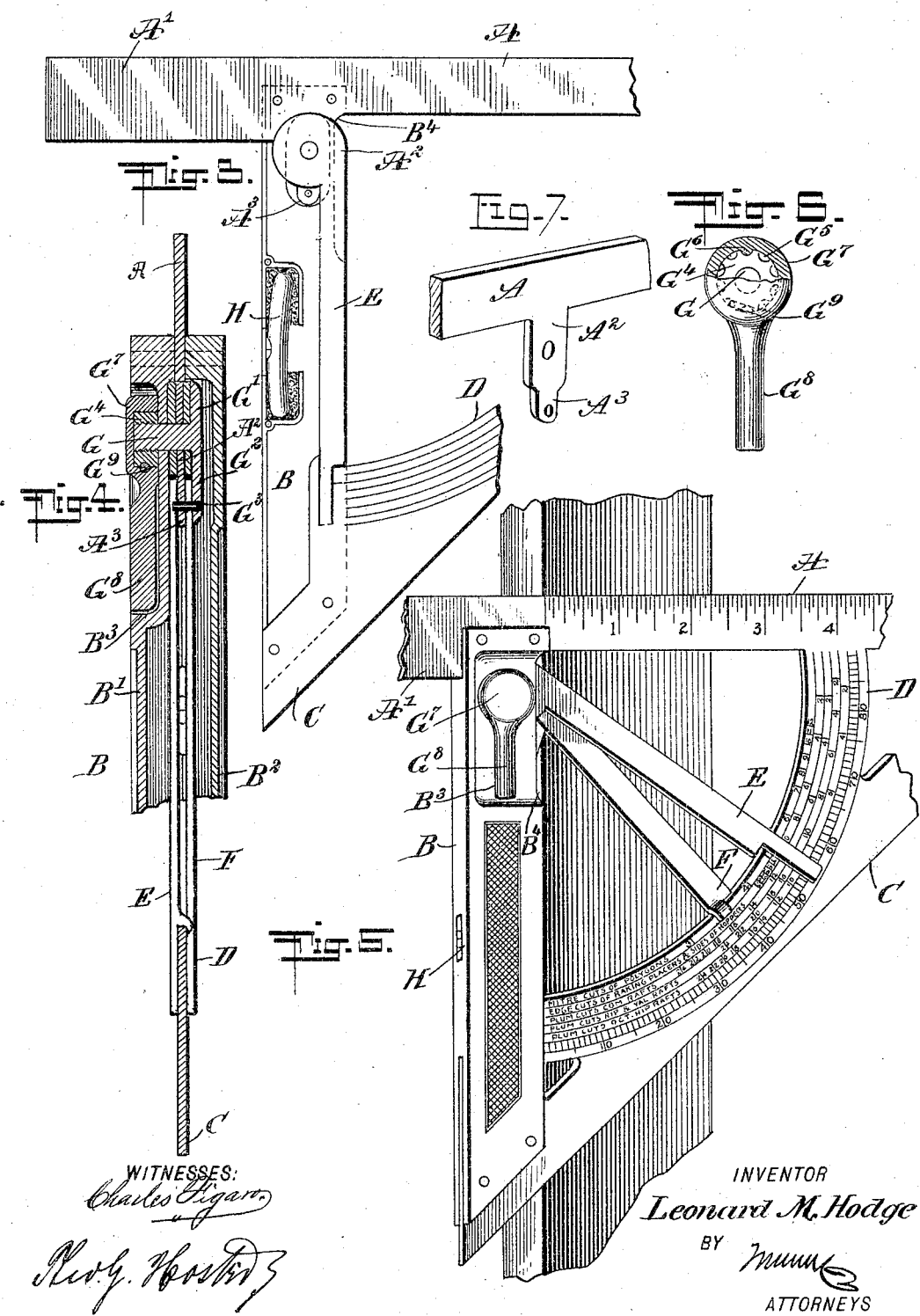

No. 776,325.　　　　　　　　　　　　　　　　　　　　　Patented November 29, 1904.

UNITED STATES PATENT OFFICE.

LEONARD MARION HODGE, OF SAN JOSE, CALIFORNIA, ASSIGNOR OF ONE-HALF TO WILLIS P. HOLMES, OF SAN JOSE, CALIFORNIA.

MEASURING INSTRUMENT.

SPECIFICATION forming part of Letters Patent No. 776,325, dated November 29, 1904.

Application filed November 6, 1903. Serial No. 180,058. (No model.)

*To all whom it may concern:*

Be it known that I, LEONARD MARION HODGE, a citizen of the United States, and a resident of San Jose, in the county of Santa Clara and State of California, have invented a new and Improved Measuring Instrument, of which the following is a full, clear, and exact description.

The invention relates to measuring instruments such as shown and described in the Letters Patent of the United States No. 518,103, granted to me April 10, 1894.

The object of the invention is to provide an instrument upon which is conveniently arranged the lengths, bevels, and cuts of rafters, hoppers, &c., and arms upon which any two of said bevels can be taken at the same time, together with their degree of pitch.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a front face view of the improvement. Fig. 2 is a rear face view of the same. Fig. 3 is a front face view of the improvement, part of one side being removed. Fig. 4 is an enlarged transverse section of the improvement on the line 4 4 of Fig. 1. Fig. 5 is a perspective view of the improvement in position on a rafter for marking the bevel. Fig. 6 is a sectional face view of the pivot-bolt, and Fig. 7 is a detail view of part of the base of the triangle with the integral spring clamp-tongue.

The improved measuring instrument consists, essentially, of a right-angle triangle having a base A, sides B and C, a graduated segment D, and arms E and F mounted to swing on a pivot-bolt G to indicate on opposite sides or faces of the graduated segment D. The graduations on the front side of the segment D (see Figs. 1 and 5) indicate miter cuts of polygons, edge cuts of raking planchers and sides of hoppers, plumb cuts of common rafters, plumb cuts for hip and valley rafters, and plumb cuts for octagonal hip-rafters, the said side being also provided with a degree-scale. On the front face of the side C is given a scale in which the figures "2," "4," "6" to "24" represent the rise of the rafters in inches to each foot of run, while the figures "12." "17" to "26." "83" and separated from the first figures by the marks "=" give the hypotenuse of the rise and run, which is the length of the rafter for each foot of run. As shown, the lengths of rafters are given in this scale or table for twelve different pitches from two to twenty-four inches rise to the foot of run. The graduations on the other or rear side of the segment D indicate seat cuts for common rafters, octagonal raking plancher cuts, seat cuts for hip and valley rafters, backing for hips, seat cuts for octagonal hip-rafters, backing for octagonal hips, raking plancher cuts, side bevel for jack-rafters, side bevel for hip and valley rafters, side bevel for octagonal hips, and side bevel for octagonal jack-rafters. On this rear face of the side C and the base A (see Fig. 2) are given rafter-scales similar to the one on the front face of the side C, one of the scales giving the lengths of hip and valley rafters and the other giving the lengths of octagon hip-rafters in corresponding pitches to those of the scale of common rafters on the front face, as previously described.

The base A is provided on its front face with a graduation indicating linear measurement, (see Fig. 1,) and a similar graduation is on the rear face of an extension A' of the base A, as plainly indicated in Fig. 2, the said extension forming, with the handle B, a try-square.

The base A, the side C, and the segment D are formed in one piece, while the side B, which forms the handle of the instrument, is riveted or otherwise secured to the base A and the side C, and the said side B is made in two parts B' and B², (see Fig. 4,) spaced apart at the inner portions to form a recess for the arms E and F to fold in. The pivot-bolt G for the arms E and F to swing on is held in the part B' of the side B (see Fig. 4) and passes through an opening in a spring clamp-tongue A², extending integrally from the base A to separate the arms E and F at their fulcrum ends to permit free swinging of either arm without disturbing the position of the other arm.

The head G' of the pivot-bolt G fits into a recess in the inner face of the side part B², and the head G' has an extension-lug G², carrying a transverse pin G³, engaging an extension-lug A³, formed integrally on the spring-tongue A² to hold the pivot-bolt G against turning in its bearings. A nut G⁴, screwing on the threaded end of the pivot-bolt G, is provided at its peripheral face with transverse notches G⁵, one of which is adapted to be engaged at a time by a lug G⁶, formed on the head G⁷ of a wrench, having a handle G⁸ adapted to be taken hold of by the operator to manipulate the wrench to screw the nut G⁴ inward or outward when clamping or unclamping the arms E and F. The wrench and the nut G⁴ extend in a recess B³, formed in the outer face of the side part B', so as to leave no projection on the outer face of the side B to prevent the wrench from striking against objects and loosening nut G⁴ and freeing the arms E and F when clamped in position on graduations. The construction described also prevents injury to the wrench and the pivot-bolt, as the latter is completely concealed. By having the head G⁷ of the wrench provided with the projection G⁶ it is evident that any wear on the pivot-bolt G can be readily compensated for by engaging the projection G⁶ with another recess G⁵ in the nut G⁴ to insure at all times a proper clamping of the arms E and F after the same have been set to the desired positions on the graduations of the segment D.

When the wrench-head G⁷ has been fitted onto the nut G⁴ at the desired place, then a set-screw G⁹ is used to rigidly fasten the wrench to the nut, the said set-screw screwing in the head G⁷ and extending into an annular groove in the peripheral face of the nut G⁴. (See Fig. 6.)

The inner edge of the side B adjacent to the recess B³ is provided with a cut-out portion B⁴, so as to allow the operator to readily view a line made on one face of a rafter—for instance, as shown in Fig. 5—to properly bring the corresponding arm E or F in accurate position relative to the marked line on the other face of the rafter. (See Fig. 5.) In case it is desired to cut a jack-rafter—for instance, for fitting a hip or valley rafter—it is necessary to make two cuts—that is, the plumb cut and the side bevel. After the instrument is set with the arms E and F indicating at the proper point on the graduations of the segment D then the instrument is applied to the rafter to allow the operator to mark the plumb cut across one side of the timber, and then the latter is turned over on its edge and the instrument is placed on the upper face to bring the other arm to intersect the end of the line, (see Fig. 5,) and as the side B has the cut-out portion B⁴ it is evident that the operator can readily see the line previously made, and consequently can shift the instrument so as to bring the arm F in proper position relative to the line previously made to produce a line for the side bevel. It will be readily seen that without the recess B⁴ the plumb-cut line could not be seen when the instrument is placed in position against the timber for marking the latter for the side bevel, and consequently the side-bevel line across the edge of the timber could not be made to accurately intersect at the corner of the timber with the plumb-cut line, which operation is necessary to insure accuracy in cutting.

When the instrument is to be used for setting the arms E and F, then the handle G⁸ of the wrench is moved to one side to loosen the nut G⁴, so that the arms E and F are unclamped and are free to swing into the desired positions. When this has been done—that is, when the arms have been set on the desired marks on the graduations of the graduated segment D—then the operator swings the handle G⁸ in the opposite direction to screw up the nut G⁴, thereby drawing the bolt G transversely for the head G' to press on the arm F, which in turn presses on the spring-tongue A², and the latter presses on the arm E to clamp the two arms securely in position, and thus hold the same against accidental movement. The instrument is now used for producing the desired cuts on rafters, &c., in the usual manner.

The instrument shown and described may be used for various other purposes—for instance, for obtaining the lengths of the sides of polygons, for obtaining the degree of angle of any or all of the cuts given on the instrument, &c.

In the side B and between the parts thereof is fitted a level H of any approved construction to indicate the horizontal positions of the side B and the part to which the instrument is applied.

Having thus described my invention, I claim as new and desire to secure by Letters Patent—

1. A measuring instrument, comprising a right-angle triangle provided with a graduated segment and having a recess formed in its outer face, a tongue extending from the base of the triangle, arms indicating on the said segment, a pivot-bolt on the triangle for the arms to swing on and to clamp the same in place, the pivot-bolt extending through the said tongue, a handled nut on the pivot-bolt extending in the recess in the triangle, and means for preventing the pivot-bolt from turning in its bearings when the said arms are turned, as set forth.

2. A measuring instrument comprising a right-angle triangle provided with a graduated segment, and arms indicating on said segment and pivoted on the triangle, a portion of the triangle, adjacent to the pivot and in the range of the pivoted arms, being cut out, as set forth.

3. A measuring instrument comprising a right-angle triangle having a graduated segment and a tongue, a pivot-bolt carried by the triangle and extending through the tongue, arms indicating on the graduated segment and pivoted on the said pivot-bolt on opposite sides of the said tongue and an interlocking connection between the pivot-bolt and the said tongue, as set forth.

4. A measuring instrument provided with a pivot-bolt, having a nut formed with recesses in its peripheral face and also having an annular groove in said peripheral face, a handle fitting the nut and having a projection for engaging one of the said recesses, and a screw screwing in the handle and projecting into the annular groove in the peripheral face of the nut, as set forth.

5. A measuring instrument comprising a right-angle triangle having a graduated segment and a tongue, a pivot-bolt, extending through the tongue, the head of the pivot having a pin engaging an aperture in the said tongue, and arms pivoted on the said pivot-bolt on opposite sides of the said tongue, as set forth.

6. A measuring instrument comprising a right-angle triangle having a graduated segment, a tongue extending from the base of said triangle, a pivot-bolt held in one of the sides of said triangle and extending through the tongue, the head of the pivot having an extension-lug, a transverse pin carried by said lug and engaging the said tongue, and arms pivoted on the said pivot-bolt on opposite sides of the said tongue and indicating on the said segment, as set forth.

7. A measuring instrument comprising a right-angle triangle provided with a graduated segment, the base of the triangle being formed with an integral tongue, a pivot-bolt provided with a head on its inner end and held in one of the sides of the triangle, the said side having a recess in its outer face, a handled nut on the outer end of the pivot-bolt and extending in the said recess, the said side of the triangle having a recess for the head of the pivot-bolt, the said bolt extending through the integral tongue, and arms pivoted on the pivot-bolt on opposite sides of the said tongue and adapted to indicate on said segment, the inner edge of the side of the triangle carrying the pivot-bolt having a cut-out portion adjacent to the recess in the outer face of said side, as set forth.

In testimony whereof I have signed my name to this specification in the presence of two subscribing witnesses.

LEONARD MARION HODGE.

Witnesses:
E. BREITH,
VIOLA W. TURNEY.